United States Patent [19]

Brady et al.

[11] Patent Number: 5,671,390

[45] Date of Patent: Sep. 23, 1997

[54] LOG STRUCTURED ARRAY STORAGE SUBSYSTEM USING LSA DIRECTORY AND LSA SUB-DIRECTORY STORED IN DIFFERENT STORAGE MEDIA

[75] Inventors: James Thomas Brady, San Jose; Alden B. Johnson, Los Gatos, both of Calif.; John Chi-Shing Lui, Shatin, Hong Kong; Jaishankar Moothedath Menon; Shin-Yuan Tzou, both of San Jose, Calif.

[73] Assignee: International Business Machines Corporation, Armonk, N.Y.

[21] Appl. No.: 449,385

[22] Filed: May 23, 1995

[51] Int. Cl.[6] .................................................. G06F 17/30
[52] U.S. Cl. ................................... 395/440; 395/463
[58] Field of Search ............................... 395/463, 182.04, 395/600, 441, 888, 575, 440, 415, 416, 417, 418, 419; 371/10.1

[56] References Cited

U.S. PATENT DOCUMENTS

| | | | |
|---|---|---|---|
| 4,481,724 | 11/1984 | Belsan et al. | 395/441 |
| 4,888,691 | 12/1989 | Geroge et al. | 364/300 |
| 4,972,316 | 11/1990 | Dixon et al. | 364/200 |
| 5,124,987 | 6/1992 | Milligan et al. | 371/10.1 |
| 5,275,370 | 1/1994 | Letwin | 395/650 |
| 5,276,835 | 1/1994 | Mohan et al. | 395/425 |
| 5,403,639 | 4/1995 | Belsan et al. | 395/610 |
| 5,408,644 | 4/1995 | Schneider et al. | 395/575 |
| 5,418,921 | 5/1995 | Cortney et al. | 395/425 |
| 5,488,701 | 1/1996 | Brady et al. | 395/182.04 |
| 5,493,668 | 2/1996 | Elko et al. | 395/457 |
| 5,537,588 | 7/1996 | Engelmann et al. | 395/600 |
| 5,551,003 | 8/1996 | Mattson et al. | 395/463 |
| 5,557,792 | 9/1996 | Josten et al. | 395/610 |
| 5,568,629 | 10/1996 | Gentry et al. | 395/441 |
| 5,574,952 | 11/1996 | Brady et al. | 395/888 |
| 5,579,474 | 11/1996 | Kakuta et al. | 395/182.04 |
| 5,608,890 | 3/1997 | Berger et al. | 395/440 |

OTHER PUBLICATIONS

Potter et al, Array Processor Supercomputers, IEEE, pp. 1896–1914 Dec. 1989.

*Primary Examiner*—Thomas G. Black
*Assistant Examiner*—Frantz Coby
*Attorney, Agent, or Firm*—Paik Saber

[57] ABSTRACT

A method and means are disclosed in a Log Structure Array (LSA) storage subsystem for managing said subsystem without a need for an access to a complete LSA directory in a RAM. This object is achieved by maintaining (1) a subset of the LSA directory (referred to as LSA sub-directory) in a RAM where the LSA sub-directory comprises the logical track address of a predetermined number of most recently accessed logical tracks; (2) a journal of changes to the LSA directory which is maintained on a different power boundary than the LSA directory power boundary; and, (3) an array of bit maps, one bit map per segment which is used for fast garbage collection thus eliminating the need for having an access to a complete LSA directory in a RAM during garbage collection.

27 Claims, 7 Drawing Sheets

LOG STRUCTURED ARRAY STORAGE SUBSYSTEM USING LSA DIRECTORY AND LSA SUB-DIRECTORY STORED IN DIFFERENT STORAGE MEDIA

BACKGROUND OF THE INVENTION

1. Technical Field

The present invention relates in general to a log-structured array (LSA) storage subsystem, and in particular to a method and a system for efficient management of an LSA directory in such storage subsystem.

2. Description of the Background Art

One of the most commonly used storage means in data processing systems are magnetic storage subsystems such as direct access storage devices (DASDs). A typical DASD subsystem is a 10.8" Form Factor IBM 3390 Model 9 capable of storing 270 gigabytes of data. Although substantial efforts have been made in recent years to improve the reliability, capacity, performance, and cost of such systems, these factors have remained as major issues in large form factor DASDs. Consequently, alternative designs have been pursued in recent years to address one or more of the aforementioned concerns.

One of the emerging alternatives to the large form factor DASDs is a storage subsystem which comprises arrays of parallel small form factor magnetic disk drives such as 2½" and 3½" drives. Small form factor disk drive arrays (arrays) can be designed such that they emulate large form factor devices, yet offer advantages such as lower cost, smaller size, improved performance, and reduced power consumption. However, the reliability of such arrays could potentially be worse than large form factor DASDs, because small form factor disk drives failure in arrays occur more frequently than in large form factor DASDs. Therefore, a number of alternative array architectures have been developed to improve the overall reliability of arrays, despite the possible poor reliability of individual small form factor disk drives. One such architecture is a Log Structured Array.

Log Structured Arrays (LSAs)

One small form factor disk drive storage subsystem which emulates the characteristics of a large form factor DASD and at the same time provides an inexpensive, high performance, lower cost, and high reliability storage subsystem is a log structured array (LSA) storage subsystem. The LSA storage subsystem typically comprises a storage array and an array controller unit in working combination.

In the data processing system having an LSA storage subsystem, the host computer views the storage array as one or more logical devices where the mapping between the logical and physical devices is usually maintained at array control unit. The logical device which is the representation of the physical storage device as seen by the host system, is used to emulate the characteristics of the large form factor DASD subsystem.

The host treats the logical device as its storage device where data is accessed using a logical addressing scheme. The logical address of the logical device is mapped into the LSA storage subsystem at the array controller unit which makes the storage array of small form factor devices transparent to the host computer.

U.S. Pat. No. 5,124,987 issued on Jun. 23, 1992, provides an example of a small form factor LSA storage subsystem. An LSA in general consists of N+M disk drives connected in parallel. Each disk drive is typically divided into large consecutive areas called "segment-columns". A segment-column is typically as large as a physical cylinder in a disk drive. Corresponding segment-columns from the N+M disk drives constitute a "segment". In order to keep track of the logical tracks addresses in the controller memory and their corresponding physical array locations, an LSA directory is maintained in the array controller unit.

In order to improve reliability in an LSA storage subsystem, a parity protection scheme is further utilized where one of the segment-columns of a segment in the storage array contains the parity (XOR) of the remaining segment-columns of the segment. For performance reasons, the parity segment-columns are not all stored on the same disk drive, but are stored among several disk drives in the storage array.

Note that in the LSA storage subsystem architecture, the logical device can be larger or smaller than the physical device. Furthermore, the logical device may be stored on multiple physical devices. A track on a logical device is also defined as a logical track (LT). It is the track as seen by the host system which may be larger or smaller than a physical track in a disk drive. As may further be appreciated by those skilled in the art, data may be stored in fixed block or variable length format such as "Count, Key, and Data" (CKD) format as used in IBM 3390 type systems.

AS mentioned earlier, since the physical location of data associated with a logical track changes over time, a directory, called the LSA directory, is utilized which indicates the current physical location of data associated with each logical track on the disks.

Writes to the LSA storage subsystem issued by the host computer are received into a write buffer. The write buffer is usually a size of a segment. When the write buffer is filled up with about a segment worth of data, the data along with newly calculated parity is written into a free segment in the storage array. Furthermore, all logical tracks that were just written to the storage array from the write buffer have their entries in the LSA directory updated to reflect their new disk location. The physical disk addresses at which each of these logical tracks are written is also stored in a segment directory which is written to the disk as part of the segment just written to the disk. The segment directory contains a time stamp, the number of logical tracks written in the segment, and the disk address of each of these logical tracks.

Garbage Collection

Over time, data movements in an LSA storage subsystem create invalid data commonly referred to as "holes". To ensure that the host always has an access to empty segments to write to, the array controller unit utilizes a garbage collection procedure to eliminate the holes and create free segments. Segments are selected for garbage collection based on predetermined criteria, such as selecting for garbage collection those segments having at least X number of holes.

During garbage collection all segment-columns of the selected segment are read from the disk. The data in the segment-columns are examined, valid data (not holes) are read into the write buffer, and then the segment is tagged as a free segment. The valid data in the write buffer is then processed in the same manner as new write data.

In order to determine whether a logical track and its associated data in a segment is still valid, the logical track address in the segment directory of the segment just read is compared to the logical track address in the LSA directory. If the two addresses match, the logical track is still valid;

otherwise, it has been moved and the data in the segment is no longer valid which means a hole has been created.

LSA Directory Size Issue

As mentioned earlier, an LSA directory which comprises a logical track address for each logical track addressable by the host system is used to accurately record the location of all data within the array. One of the main problems associated with an LSA subsystem is the size of the LSA directory. A substantial amount of random access memory (RAM) or alternatively, non-volatile RAM (NVRAM) has to be used to store such a directory. For example, a typical LSA directory entry for a 50 KB logical track is 8 bytes. A 4 GB physical device can have 80,000 logical tracks. Therefore, an array of 64 devices requires 8×80,000×64 bytes of RAM or about 40 MB of RAM to store a complete LSA directory. The size of an LSA directory could be much higher if the data associated with a logical track is stored in a compressed format. For example, if a typical 3 to 1 compression ratio is used to store logical tracks, then the complete LSA directory size will be about 120 MB. Furthermore, in order to avoid a single point of failure, at least two copies of the complete LSA directory have to be maintained, which means the RAM required to store such directories would be about 240 MB. Of course, the RAM requirement can easily approach 500 MB in storage array subsystems having 128 devices or more.

Considering that not all array subsystems can afford so much RAM to store copies of a complete LSA directory, those skilled in the art have been actively engaged to find new and novel means and method to minimize the RAM requirement in such array subsystems without compromising LSA storage subsystem (array subsystem) performance, integrity, and reliability.

SUMMARY OF THE INVENTION

It is therefore a principal object of the present invention to provide a method and means for eliminating the need for access to the full LSA directory in a RAM for managing an LSA storage subsystem, thereby minimizing the amount of RAM storage space required for storing logical track addresses.

It is another object of the present invention to provide an alternative method for garbage collection which is not dependent on having the full LSA directory in the RAM in an LSA storage subsystem.

The foregoing objects are achieved by the invention disclosed herein. Briefly stated, a method and means are disclosed comprising the following elements:

First, instead of having a full copy of the LSA directory in the RAM, only a subset of the LSA directory (referred to as LSA sub-directory) is maintained in the RAM. The LSA sub-directory comprises the logical track addresses of a predetermined number of most recently accessed logical tracks. Furthermore, one or more complete copies of the LSA directory are also maintained in the storage array on one or more disks;

Second, a journal of changes to the LSA directory is stored in a RAM which is maintained on a different power boundary than the LSA directory power boundary. The journal contains the changes to the LSA directory since it was last updated. The journal may be used to update the LSA directory in the case of LSA sub-directory failure; and, Third, an array of bit maps, one bit map per segment (referred to as "Valid tracks in segment" bit map), is stored in a RAM. The bit map which is used for fast garbage collection eliminates the need for having an access to a complete LSA directory in the RAM during garbage collection.

In order to ensure that the LSA sub-directory includes the most recently accessed logical track addresses at any given time, a well-known least recently used (LRU) scheme is utilized to manage the LSA sub-directory. Using this scheme, the oldest entry of a logical track address in the LSA sub-directory is deleted whenever there is a need to bring a particular logical track address entry into the LSA sub-directory.

Whenever the data in the write buffer is written into a segment, all the LSA directory entries corresponding to all logical tracks being written have to be changed. If entries corresponding to these logical tracks are in the LSA sub-directory then the entries are changed in the RAM where the LSA sub-directory is maintained. If these entries are not already in the LSA sub-directory, they will be added to the LSA sub-directory in the RAM. In either case, new journal entries reflecting the changes just made are also appended to the journal in a separate RAM. Each journal entry corresponds to a logical track destaged or written to the storage array in a segment and includes a logical track address and the new physical disk address for that logical track. For reliability purposes, the RAM where the journal is stored is maintained in a different power boundary than the power boundary where the LSA sub-directory is stored.

Periodically the complete LSA directory in the storage array is updated using the LSA sub-directory. The journal may also be used to update the LSA directory in case the LSA sub-directory is unavailable due to, for example, failure.

Alternatively, to further ensure that the LSA sub-directory maintains almost always all the requested logical track addresses, the host system can be required to inform the LSA storage subsystem every time a file is created, opened, closed or deleted. For example, when a file is created, the host system sends to the array subsystem the file just created along with a list of logical tracks allocated to that file. Or, when a file F is opened, the array subsystem which maintains a map between the logical tracks and the files, reads in all the LSA directory entries corresponding to all the logical tracks allocated to file F and stores those entries in the LSA sub-directory in the RAM. This way, by the time file F is accessed, all its relevant information are already available in LSA sub-directory in the RAM.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode for carrying out the invention. This description and the number of alternative embodiments shown are made for the purpose of illustrating the general principle of the present invention and is not meant to limit the inventive concepts claimed herein.

Figure 1:
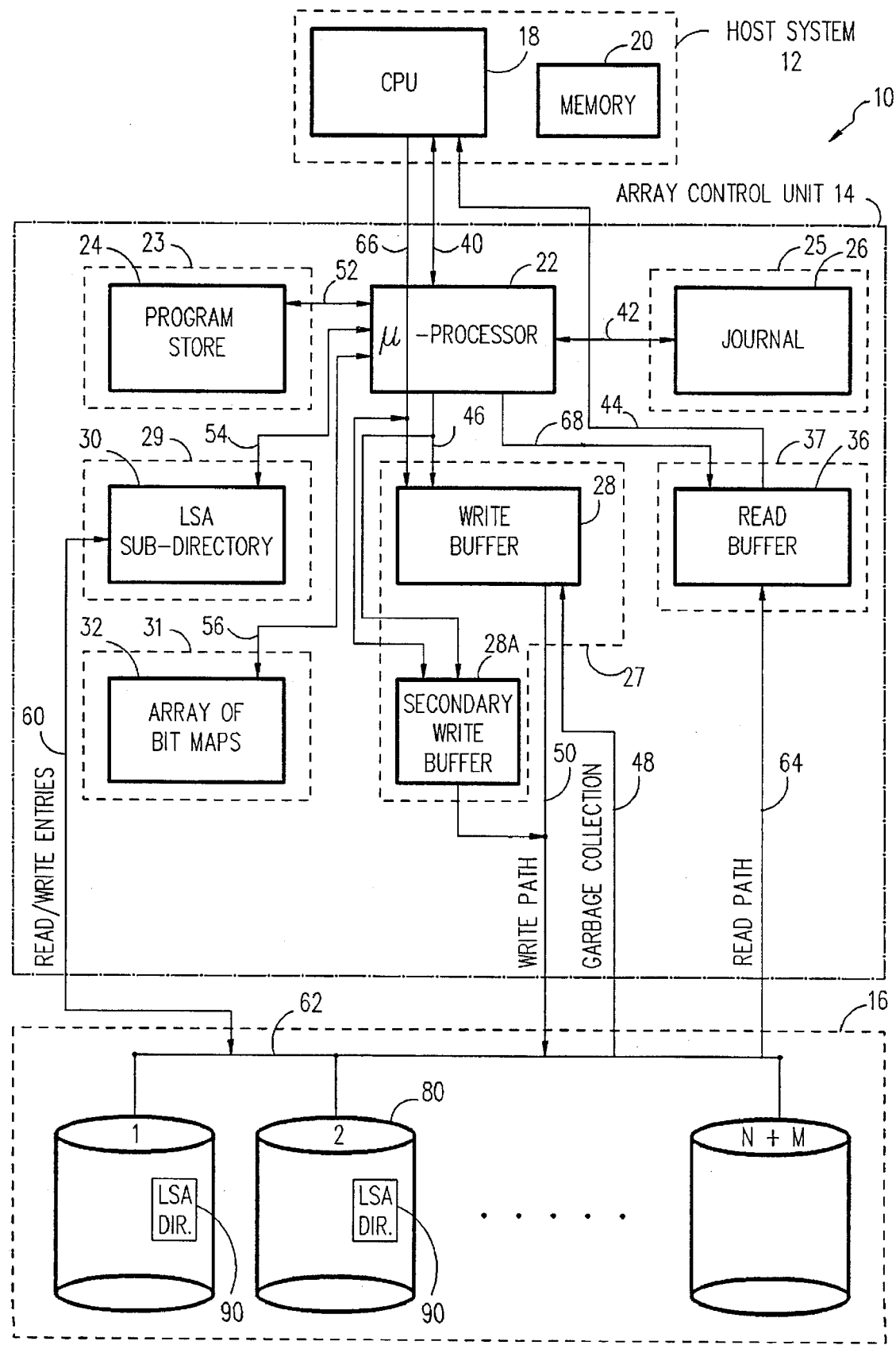
FIG. 1 is an example of a small form factor LSA storage subsystem in communication with a host system for carrying out the preferred embodiment of the present invention.

Now referring to FIG. 1, there is shown a data processing system 10 for carrying out the present invention comprising a host system 12, a storage array 16, and an array controller unit 14 coupling host system 12 to storage array 16. Storage array 16 together with array controller unit 14 form LSA storage subsystem 11. Storage array 16 comprises N+M storage devices connected in parallel by link 62. The storage devices are preferably small form factor magnetic disk drives although they could be any other type of storage devices such as optical storage devices. Host system 12 comprises at least one CPU 18 used to execute applications and system codes, memory unit 20 for storing application codes, system codes, and data, and an operating system for controlling the host system operation.

Array control unit 14 which manages read and write to storage array 16 comprises a microprocessor 22, program store 24 stored in RAM 23, journal 26 stored in NVRAM (non-volatile RAM) 25, write buffer 28 stored in NVRAM 27, LSA sub-directory 30 stored in NVRAM 29, array of bit maps 32 stored in NVRAM 31, and a read buffer 36 stored in RAM 37. Microprocessor 22 receives instructions from CPU 18 via link 40 and interprets each of those instructions and responsively applies necessary signals over path 54 to LSA sub-directory 30 to ascertain location of data on array subsystem 16.

In the preferred embodiment LSA sub-directory 30, journal 26, and array of bit maps 32 reside in an NVRAM although, they could alternatively reside in a RAM or any other type of semiconductor memory having read and write capabilities.

During the read operation, data is transferred from storage array 16 to host system 12 over a path including link 62, read paths 64 and 44, and read buffer 36. Read buffer 36 is also in communication with microprocessor 22 over control line 68. During the write operation, data is transferred from host system 12 to storage array 16 over a path including path 66, write buffer 28, write path 50, and link 62. Write buffer 28 is also in communication with microprocessor 22 over link 46. Note that in the LSA architecture employed here, the write data is first received into a write buffer 28, preferably maintained in non-volatile RAM (NVRAM) 27, before it is written into the disk. The write buffer is typically the size of an array segment, and is configured to include N+M blocks where each block is typically the size of a segment-column. When write buffer 28 is full, i.e. a segment worth of writes have been received, this data along with newly calculated parity is written to a free segment in storage array 16.

In the preferred embodiment, array control unit 14 further comprises a secondary write buffer 28A to store write data whenever buffer 28 is either full or is in the process of writing its content into storage subsystem 16. When buffer 28A becomes full, its content is either written into write buffer 28 or is written directly into storage subsystem 16. In the preferred embodiment all the codes for write operation, read operation, and garbage collection are stored in program store 24 although they could alternatively be stored in any other memory location.

In the LSA architecture as shown in FIG. 1, host system 12 views storage array 16 as one or more logical devices where the mapping between the logical and physical devices is usually maintained at array control unit 14. Each logical device comprises a plurality of logical tracks. CPU 18 writes data to logical tracks of the logical device where logical tracks are mapped to physical tracks of disk drives in storage array 16. Mapping is done by array control unit 14 which is transparent to host system 12 since the host system accesses data by logical address as opposed to physical address.

According to the present invention, a mapping table referred to as LSA sub-directory 30 is maintained in NVRAM 29 for keeping an updated list of predetermined number of most recently accessed logical track addresses and their mapped physical addresses. In order to ensure that the most useful logical tracks are almost always present in the LSA sub-directory, an LRU scheme is used to manage the entries in the LSA sub-directory. According to the LRU scheme, when a particular logical track address needs to be added to the sub-directory, it displaces the least recently used entry in the sub-directory. Note that the larger the NVRAM is, the larger the list of predetermined number of most recently used logical track addresses will be.

Referring to FIG. 1 again, array control unit 14 also comprises journal 26 stored in NVRAM 25. Journal 26 which is in communication with microprocessor 22 via path 42, stores all the changes to the LSA directory since it was last written into array subsystem 16. Journal 26 is used by microprocessor 22 in order to update LSA directory 90 maintained in storage array 16 whenever information in the LSA sub-directory is no longer available for updating the LSA directory. In the preferred embodiment, the LSA directory 90 is maintained on more than one disk drive although, it would be obvious to those skilled in the art that directory 90 may also be stored in only one disk drive.

Shown in FIG. 1 is also an array of bit maps 32 maintained in NVRAM 31 which is used for fast garbage collection. Array of bit map 32 comprises one bit map for each segment in storage array 16, commonly referred to as "valid tracks in segment" bit map. Assuming that the maximum number of logical tracks that can fit in a segment is n, then the valid tracks in segment bit map would have at least n bits, one bit for each track in the segment.

As will be shown later, the bit map is used by the control unit to determine which logical track in a given segment is valid and which has become invalid or, as commonly referred to, has turned into a hole.

In the preferred embodiment of the present invention, the entries in LSA sub-directory 30 are 6-tuples of the form:

<logical track address, track number within segment, segment, segment column, starting sector, # of sectors>.

Figure 2:
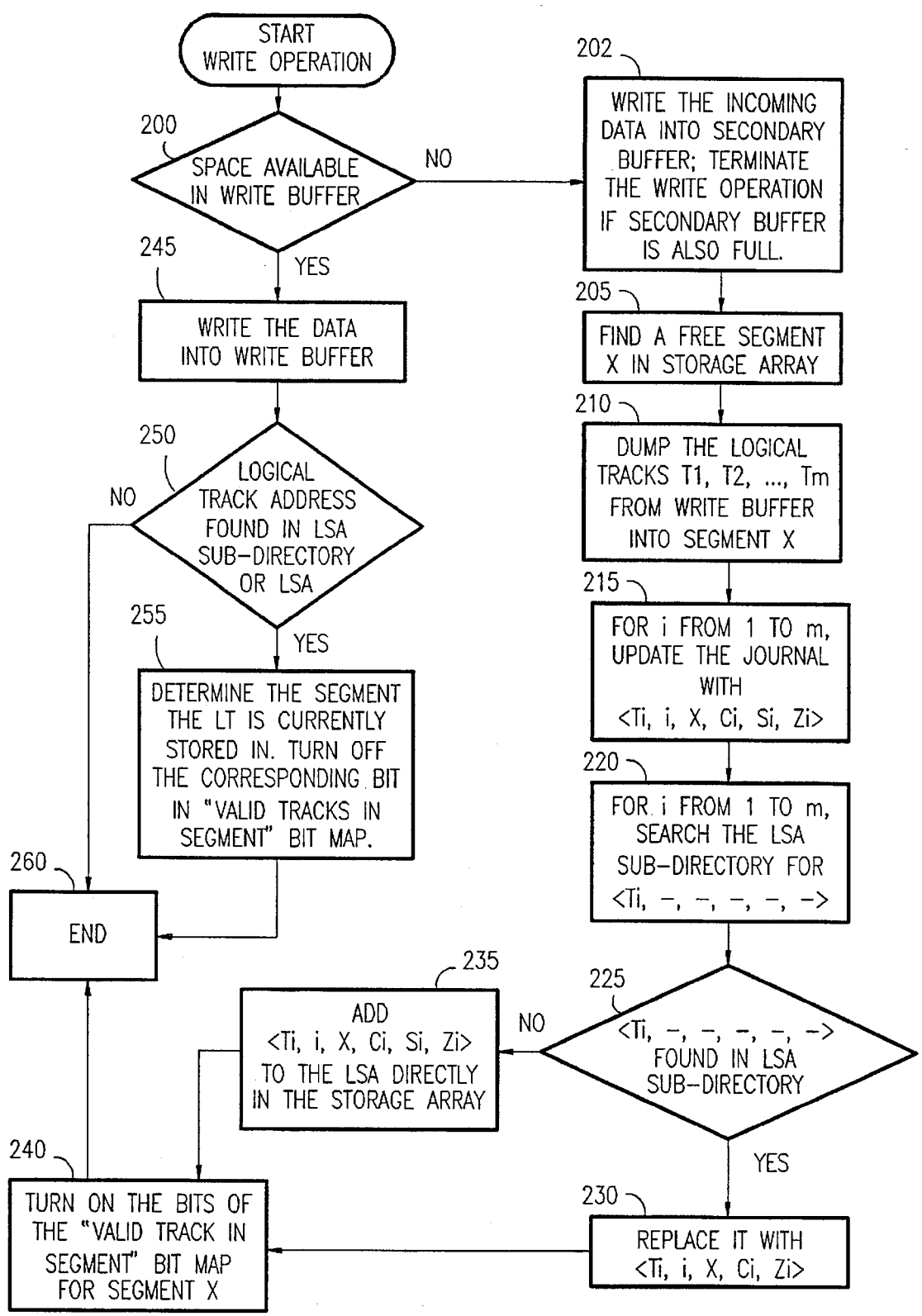
FIG. 2 is a flow chart of write operations of the preferred embodiment of the present invention.

Now with reference to FIG. 2, there is shown a flow chart for write operation according to the preferred embodiment of the present invention. With reference to FIGS. 1 and 2, when the write operation is invoked by host system 12, the host, using microprocessor 22, determines whether there is sufficient space available in write buffer 28 to store the incoming data A (block 200). If sufficient space is available, the incoming data A is written into write buffer 28 over path 66 as depicted by block 245. Buffer 28 is preferably an NVRAM, and is generally organized similar to a segment of a disk drive of storage array 16 having similar segment-columns. After writing the data A into the write buffer, microprocessor 22 first searches LSA sub-directory 30 to determine if an entry corresponding to the particular logical track associated with the data A exists (block 250). If no entry is found, microprocessor 22 then searches LSA directory 90 to determine if an entry corresponding to the particular logical track associated with the data A exists (block 250). If no entry is found, the operation is terminated (block 260). On the other hand, if an entry is found, microprocessor 22 determines the segment where the previous version of data A associated with logical track address is currently stored in storage array 16 and turns off the corresponding bit in the "valid tracks in segment" bit map (stored in memory 31) as depicted by block 255 to signal that the previous version of data A has become an invalid data.

Referring again to FIGS. 1 and 2, if there is insufficient space to hold the incoming data A in write buffer 28, the incoming data A is either stored in secondary write buffer 28A or if buffer 28A is also full, the host is informed to attempt the write operation at a later time (block 202).

Next, all the data in write buffer 28 is written into storage array 16 by finding a free segment X as depicted by block 205 and 210. Assuming that the logical tracks, representing the data stored in write buffer 28 and written into the segment X are labelled $T1, T2, \ldots, Ti, \ldots, Tm$, the physical address at which each logical track is stored is defined by a 3-tuples of the form:

<segment number X, segment column Ci, starting sector within a column Si> where
Ci is a number between 1 and N+M (number of disk drive in array 16), and
Si is a number between 1 and number of sectors per segment-column.

Referring again to FIGS. 1 and 2, after dumping the logical tracks into segment X through write buffer 28, microprocessor 22 also updates journal 26 as depicted by blocks 215. Like the LSA directory/sub-directory entry, each journal entry is also a 6-tuples of the form:

<logical track Ti, track number within segment i, segment X, segment column Ci, starting sector within a column Si, # of sectors in each track Zi>.

Thereafter, microprocessor 22 adds the entry <Ti, i, X, Ci, Si, Zi> to journal 26 for each i from 1 to m. After updating the journal, microprocessor 22 also updates LSA sub-directory 30 by searching the sub-directory for an entry in the form of <Ti, -, -, -, -, -,> where '-' can be any value (block 225). If such an entry is found, it is replaced with the entry <Ti, i, X, Ci, Si, Zi> as depicted by block 230. If such an entry is not found, the entry <Ti, i, X, Ci, Si, Zi> is added to LSA directory 90 in storage array 16 (block 230).

Finally, all the m bits of the "Valid tracks in segment" bit map for Segment X is turned on as depicted by block 240.

Figure 3:
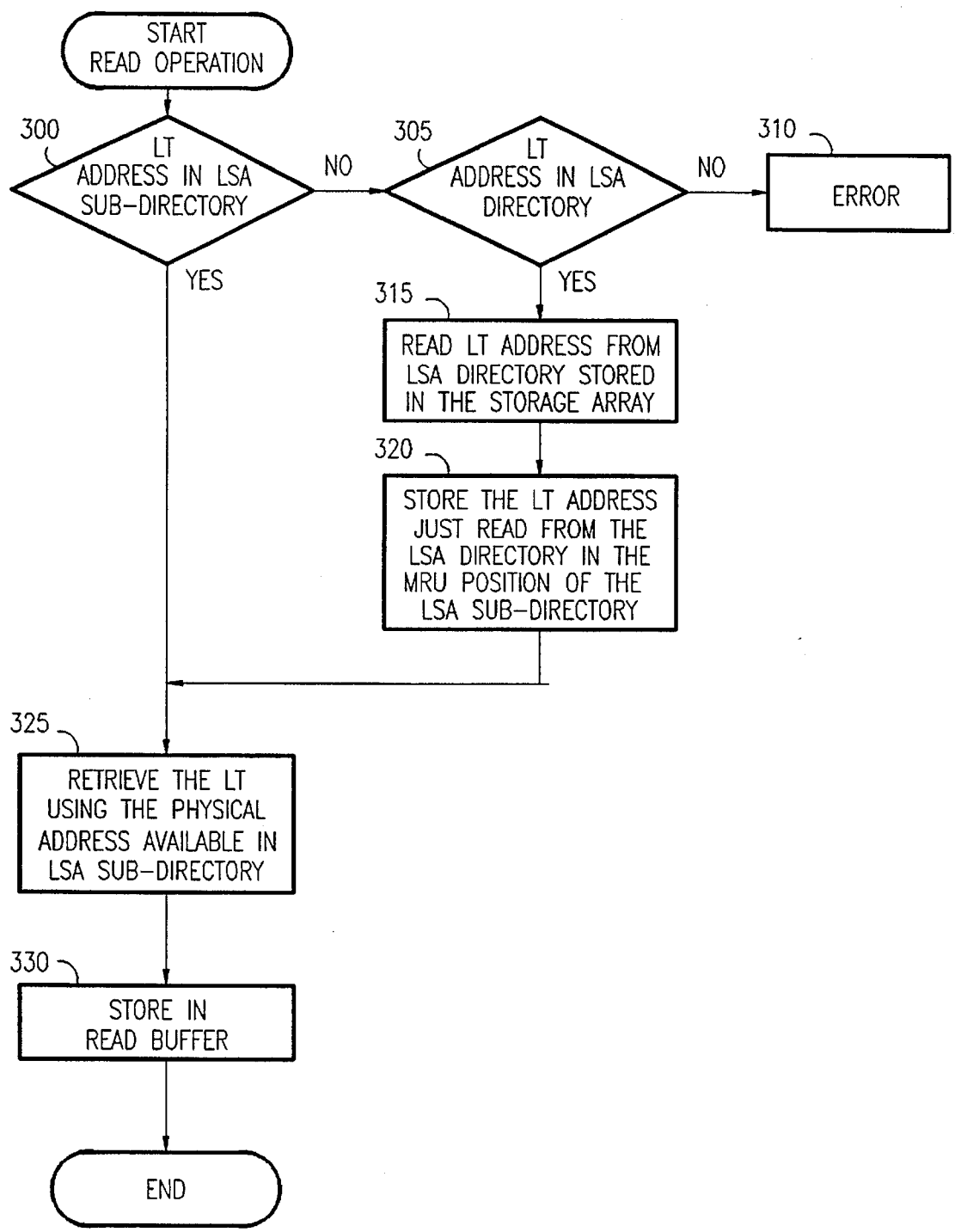
FIG. 3 is a flow chart of read operations of the preferred embodiment of the present invention.

FIG. 3 shows a flow chart for read operation according to the preferred embodiment of the present invention. Now referring to FIGS. 1 and 3, CPU 18 issues a read request for reading a particular logical track which is communicated to microprocessor 22 over the path 40. Microprocessor 22 determines if the address of the logical track requested is maintained in LSA sub-directory 30 (block 300). The logical track is retrieved from storage array 16 if LSA sub-directory 30 has the physical address at which the logical track is stored (block 325). The retrieved data is read into read buffer 36 from which it is transmitted to CPU 18 via path 44 (block 330).

Referring again to FIGS. 1 and 3, if microprocessor 22 determines that the address of the logical track requested is not available in LSA sub-directory 30 (block 300), it searches for that address in LSA directory 90 stored in storage array 16. If the logical track address is not found in either directory, an error code is communicated to the host and the read operation is terminated (block 310). If the logical track address is found in LSA directory 90, then the directory entry corresponding to the logical track address is read from the disk drive and stored in the most recently used position in LSA sub-directory 30 as depicted by blocks 315 and 320. In order to make space available in LSA sub-directory 30 for this new entry, the least recently used entry in LSA sub-directory 30 gets deleted. Thereafter, the logical track is retrieved using the physical address at which logical track is stored (block 325). The retrieved data is read into read buffer 36 from which it is transmitted to CPU 18 (block 330).

Figure 4:
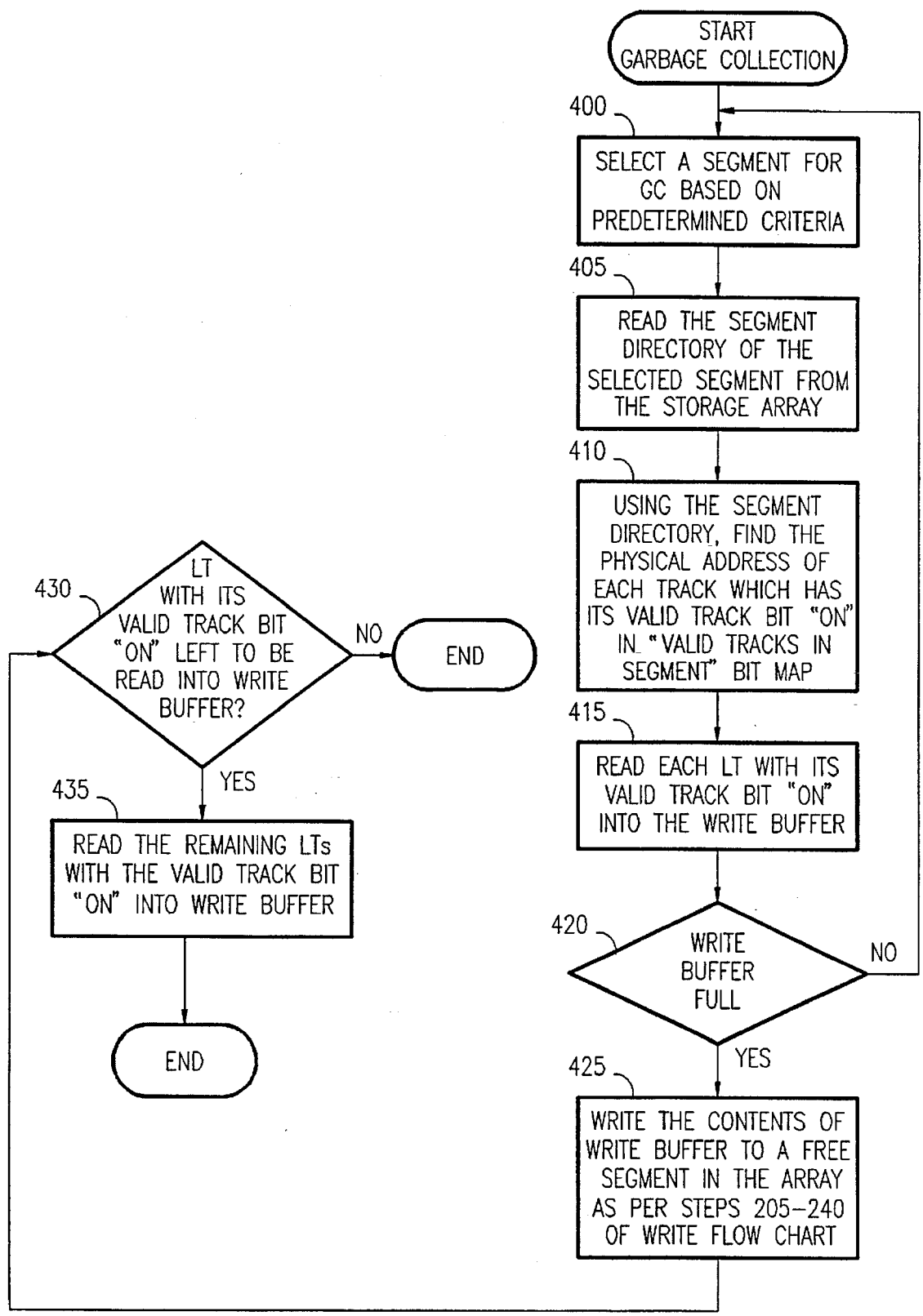
FIG. 4 is a flow chart of garbage collection of the preferred embodiment of the present invention.

Now referring to FIG. 4, there is shown a flow chart for garbage collection according to the preferred embodiment of the present invention. Referring to FIGS. 1 and 4, microprocessor 22 selects a segment in storage array 16 for garbage collection (GC) according to one or more established criteria (block 400). The segment directory of the segment selected is first read into a memory location, preferably read buffer 36. Like the entries in LSA directory 90, each entry in the segment directory is also a 6-tuples of the form:

<logical track Ti, track number within segment i, segment X, segment column Ci, starting sector within column Si, number of sectors Zi>.

Next, using the segment directory, microprocessor 22 finds the physical address of each track which still has its bit set to "on" in the "valid tracks in segment" bit map of this segment (block 410) and reads each of such logical tracks from storage array 16 into write buffer 28 (block 415). When microprocessor 22 determines that the write buffer has become full (block 420), it writes the content of write buffer 28 into a free segment of storage array 16 using the write operation of the preferred embodiment of the present invention (block 425). Next microprocessor 22 determines if there is any logical track with valid track bit on in "valid tracks in segment" bit map is left for reading (block 430) and if so, the remaining logical tracks having valid bit "on" are read into the write buffer (block 435).

In an alternative embodiment, a garbage collection buffer (not shown) may be used during garbage collection procedure to improve performance instead of using write buffer 28 during garbage collection procedure.

Figure 5A:
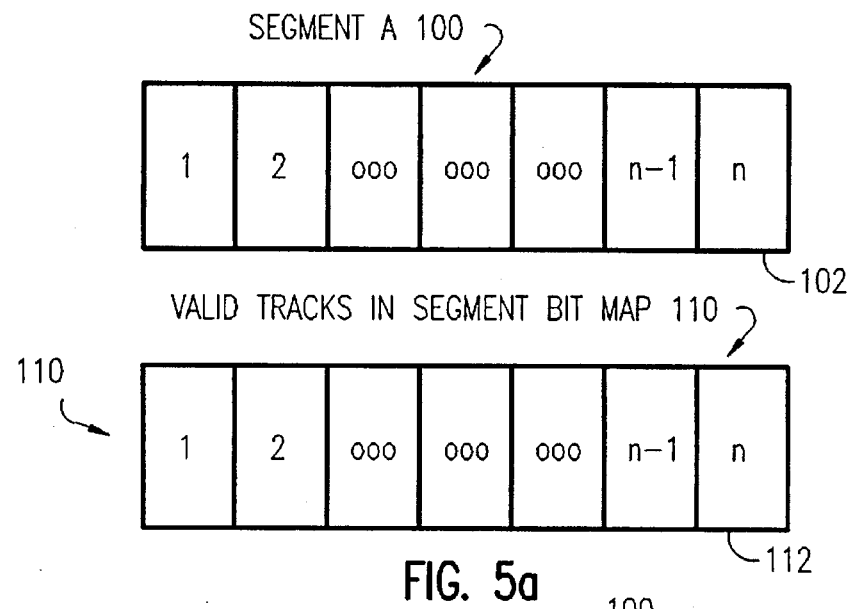
FIGS. 5a–5c illustrate a specific example of array of bit maps of the preferred embodiment of the present invention.
Figure 5B:
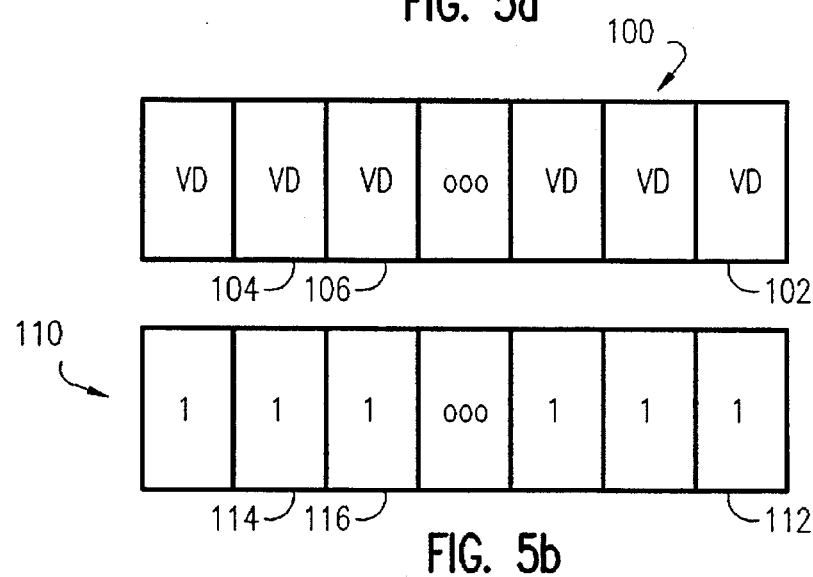
Figure 5C:
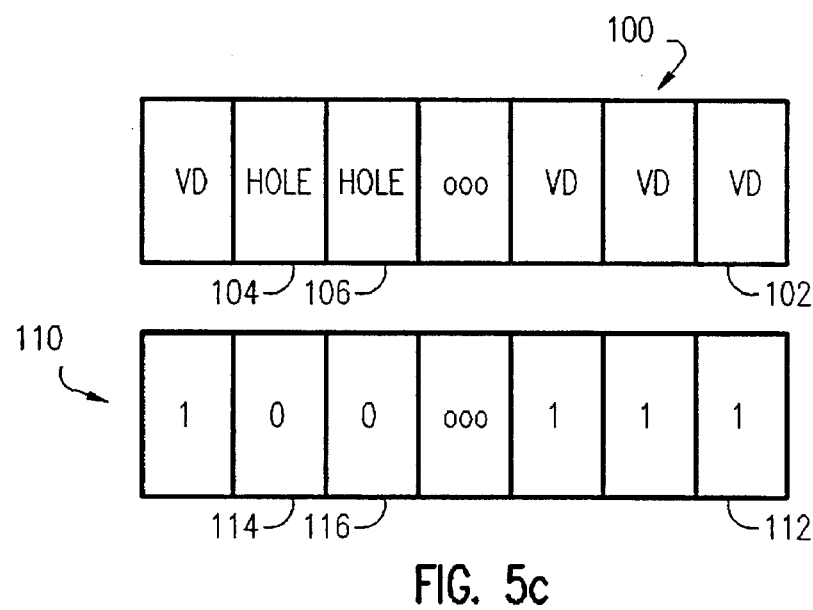

Referring now to FIGS. 5a–5c, there is shown a specific example of a "valid tracks in segment" bit map of the preferred embodiment of the present invention used for fast garbage collection. As shown in FIG. 5a, segment 100 of storage array 16 comprises n tracks 102. "Valid tracks in segment" bit map 110 of array control unit 14 comprises n bits 112, one bits for each track 102 of segment 100. As shown in FIG. 5b, when the segment 100 is initially written to, tracks 102 all contain valid data (VD) and therefore, all bits 112 in bit map 110 are set to logical level "1" representing that all the bits in the bit map have been turned on. Whenever a track is written into or moved to a new segment after the initial writing, the corresponding bit 112 in bit map 110 is immediately turned off indicating that the data in the corresponding track 102 is no longer valid and that a hole has been created. Now referring to FIG. 5c, there is shown an example of tracks 104 and 106 of segment 100 which are no longer valid and where corresponding bits 114 and 116, respectively in bit map 110 are set to the logical level "0", representing that the data at track 104 and 106 are no longer valid.

This bit map allows fast garbage collection using only LSA sub-directory 30 (FIG. 1) and segment directory without any need for an access to complete LSA directory in an NVRAM as explained below.

Referring to FIGS. 5 and 1, when a segment is selected for garbage collection, microprocessor 22 reads the segment's segment directory from storage array 16 and its valid tracks in segment bit map 112 from NVRAM 31. Bit map 112 indicates which tracks in selected segment 100 are still valid and the segment directory provides the exact disk address of the valid tracks. Using the two pieces of information provided by bit map 112 and segment directory, microprocessor 22 can conduct an efficient garbage collection because only logical tracks that are valid as indicated by bit map 112 are read from the disk at the addresses provided by the segment directory. Note that using the bit map of the present invention a fast garbage collection can be conducted without need for access to a complete LSA directory in the RAM.

Figure 6:
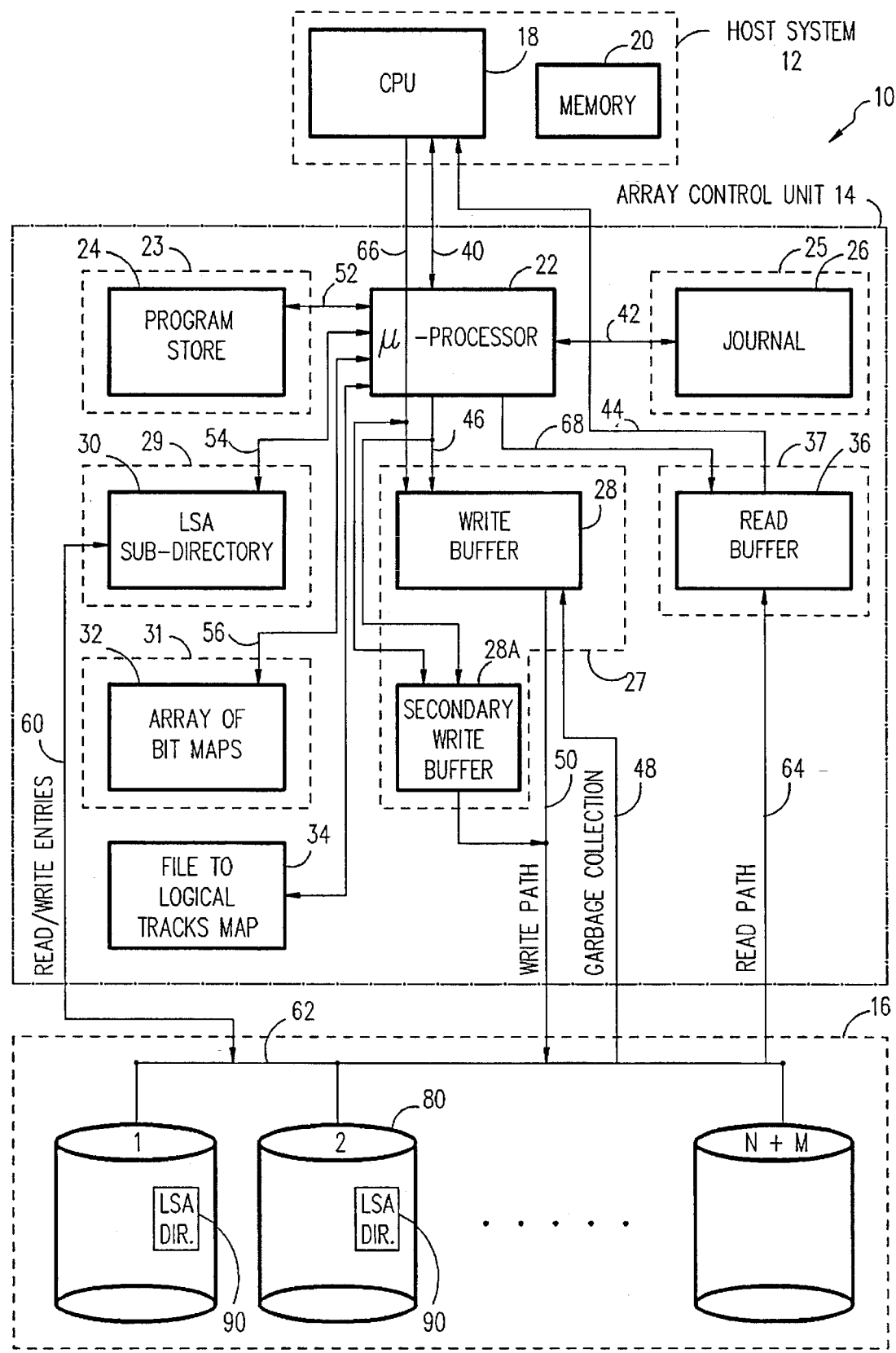
FIG. 6 is an example of a small form factor LSA storage subsystem in communication with a host system for carrying out an alternative embodiment of the present invention.

Now referring to FIG. 6, there is shown an example of an alternative LSA storage subsystem 11 in communication with a host system 12 for carrying out an alternative embodiment of the present invention utilizing open file routine. LSA storage subsystem 11 comprises a small form factor storage array 16 and an array control unit 14. In this alternative embodiment, components performing the same function as those shown in FIG. 1 are given the same numerical designation. In this embodiment, array control unit 14 further comprises a "file to logical track map" 34 utilized for processing files just opened by host system 12. Using file to logical track map 34, every time a file is opened, microprocessor 22 reads all the entries corresponding to all the logical tracks allocated to that file from LSA directory 90 (only if those entries are not already in the LSA sub-directory) and then stores them in LSA sub-directory 30. The operation is described in more detail by referring to FIG. 7 which shows a flow chart for processing open files in accordance with alternative embodiment of FIG. 6.

Figure 7:
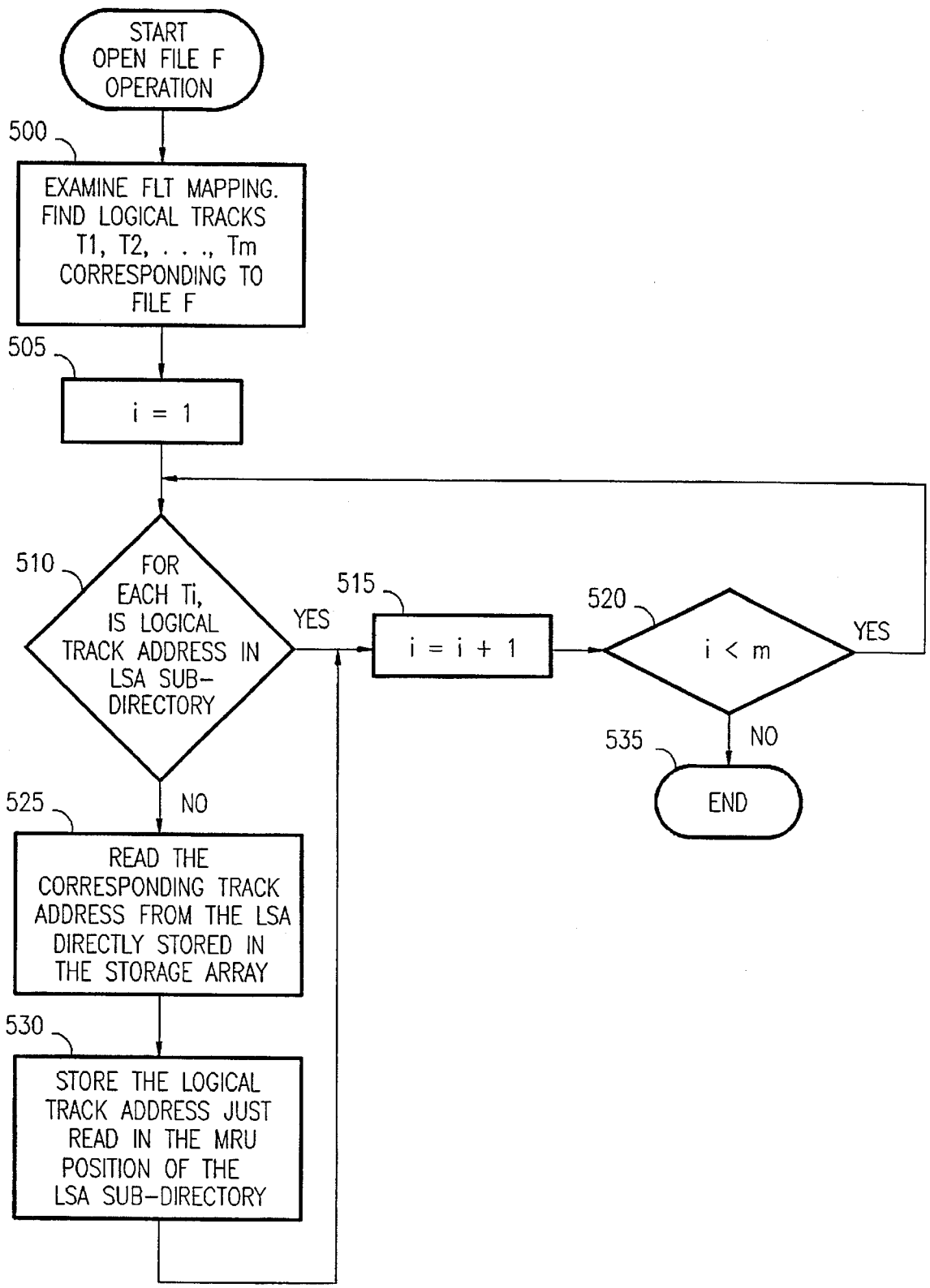
FIG. 7 is a flow chart of processing an opened file of the alternative embodiment of FIG. 6.

Referring to FIGS. 6 and 7, in this embodiment, whenever host system 12 opens a file, microprocessor 22 examines file to logical track map 34 to find logical tracks T1, T2 ..., Ti, ..., Tm corresponding to recently opened file F (block 500). For each logical track Ti, microprocessor 22 determines if a corresponding logical track address is available in LSA sub-directory 30. If so, the operation is completed for logical track Ti and microprocessor 22 continues the determination for the next logical track (blocks 510, 515, 520, 535).

If microprocessor 22 does not find the corresponding logical track address in LSA sub-directory 30, then it reads the corresponding logical track address from LSA directory 90 in storage array 16 and stores it in the most recently used position of LSA sub-directory 30. In doing so, the most useful subset of LSA directory 90 may be maintained in LSA sub-directory 30 in NVRAM 29. Note that in this embodiment, file to logical track map 34 is preferably stored in an NVRAM, although it could alternatively be stored in a RAM.

A number of embodiments of the present invention have been described. Nevertheless, it will be understood that various modifications may be made without departing from the spirit and the scope of the invention. For example, LSA sub-directory 30 and journal 26 may be both stored in NVRAM where NVRAM could be of any type including battery backed-up RAM. Alternatively, they both could be stored in RAMs, but each preferably receiving power from two independent power supplies powered by two independent AC sources. Or they both could be stored in RAMs where each is powered by separate power supplies, and the entire box has a UPS (Uninterruptible Power Supply). Or they could be stored in any memory unit having comparable or faster speed than a RAM. Also, journal 26, LSA sub-directory 30, array of bit maps 32, write buffers 28 and 28A and read buffer 36 could all be stored in a single NVRAM where the NVRAM is managed either by processor 22 and/or host system 12. The data processing system may also be of the type where the array control unit is an integrated part of the host system. Accordingly, it is to be understood that the invention is not to be limited by the specific illustrated embodiments, but only by the scope of the appended claims.

We claim:

1. A data processing system, comprising:
   a log structured array (LSA) storage subsystem including a storage array and an array control unit, said storage array including a plurality of storage devices, said storage devices configured into a plurality of segments each segment comprising a plurality of tracks, and said array control unit including:
   (i) an LSA sub-directory stored in a random access memory (RAM) in said array control unit, said LSA sub-directory comprising a logical track address for each of a predetermined number of most recently accessed logical tracks in said LSA storage subsystem,
   (ii) a microprocessor in communication with said LSA sub-directory, and,
   (iii) a write buffer for storing data prior to writing into said storage array; and
   an LSA directory having logical track address of all logical tracks in said LSA storage subsystem, said LSA directory being maintained in said LSA storage array.

2. A data processing system as recited in claim 1, wherein said array control unit further comprises a journal of changes to said LSA directory, said journal comprising changes to said LSA directory since it was last updated.

3. A data processing system as recited in claim 2, wherein said array control unit further comprises an array of valid tracks in segment bit maps, one bit map associated with each segment, said bit maps being used during garbage collection procedure.

4. A data processing system as recited in claim 2, wherein said LSA storage subsystem further comprises a segment directory including the physical disk address of each logical track written into said LSA storage subsystem.

5. A data processing system as recited in claim 1, wherein said LSA sub-directory is stored in a non-volatile random access memory (NVRAM).

6. A data processing system as recited in claim 2, wherein said journal is stored in a non-volatile random access memory (NVRAM).

7. A data processing system as recited in claim 2, wherein said journal is stored in a separate power boundary than said LSA sub-directory power boundary.

8. A data processing system as recited in claim 3, wherein said array of valid tracks in segment bit maps are stored in an NVRAM.

9. A data processing system as recited in claim 4, wherein each bit map associated with a segment comprises a plurality of bits, wherein each bit is further associated with a track of said segment, each bit, depending on its value, indicating whether the data stored in its associated track is valid.

10. A data processing system, comprising:
    a host system;
    a log structured array (LSA) storage subsystem in communication with said host system;

an LSA directory having a logical track address for all logical tracks in said LSA storage subsystem, said LSA directory being maintained in a first storage medium; and, an LSA sub-directory comprising a logical track address for each of a predetermined number of most recently accessed logical tracks in said LSA storage subsystem, said LSA sub-directory being maintained in a second storage medium.

11. A data processing system as recited in claim 10, wherein said LSA storage subsystem comprises an array control unit in communication with a storage array, said storage array comprising a plurality of storage devices.

12. A data processing system as recited in claim 10, further comprising a journal of changes to said LSA directory, said journal comprising changes to said LSA directory since it was last updated.

13. A data processing system as recited in claim 12, wherein said storage array is configured into a plurality of segments, each segment comprising a plurality of tracks, said data processing system further comprising:

an array of valid tracks in segment bit maps, one bit map associated with each segment, said bit maps being used during garbage collection procedure.

14. A data processing system as recited in claim 13 further comprising a segment directory including the physical disk address of each logical track written into said LSA storage subsystem.

15. A data processing system as recited in claim 10, wherein said second storage medium is a non-volatile random access memory (NVRAM).

16. A data processing system as recited in claim 12, wherein said journal is stored in a non-volatile random access memory (NVRAM).

17. A data processing system as recited in claim 12, wherein said journal is stored in a separate power boundary than said LSA sub-directory power boundary.

18. A data processing system as recited in claim 13, wherein said array of valid tracks in segment bit maps are stored in an NVRAM.

19. A data processing system as recited in claim 13, wherein each bit map associated with a segment comprises a plurality of bits, wherein each bit is further associated with a track of said segment, each bit, depending on its value, indicating whether the data stored in its associated track is valid or invalid.

20. In a log structured array (LSA) storage subsystem, a method of recording the location of each data in said LSA subsystem, comprising the steps of:

(a) storing an address for each of a predetermined number of data in said LSA subsystem in an LSA sub-directory, said LSA sub-directory being maintained in a first storage medium in said LSA subsystem; and (b) storing an address for each data in said LSA subsystem in an LSA directory, said LSA directory being maintained in a second storage medium in said LSA subsystem.

21. A method as recited in claim 20 wherein the step of storing an address for each of a predetermined number of data in said LSA sub-directory further comprises storing an address for each of a predetermined number of most recently accessed data in said LSA subsystem.

22. A method as recited in claim 21 wherein said LSA storage subsystem comprises an array control unit and a storage array of storage devices.

23. A method as recited in claim 22 wherein said LSA sub-directory is stored in a semiconductor memory and said LSA directory is stored in said storage array.

24. A method as recited in claim 23 wherein said semiconductor memory is a random access memory (RAM).

25. A method as recited in claim 24 wherein said RAM is a non volatile RAM.

26. In a log structured array (LSA) storage subsystem comprising an array control unit, a storage array of storage devices, an LSA sub-directory in said array control unit, an LSA directory in said storage array, a write buffer, and a valid in track segment bit map, a method of writing data, comprising the steps of:

(a) determining whether there is sufficient space in write buffer to store data A;

(b) writing said data A into write buffer if there is sufficient space in said write buffer;

(c) determining whether an address corresponding to said data A is maintained in either said LSA sub-directory or said LSA directory; and (d) if said address is found, determining the segment where the previous version of said data A is stored and turning off the bit in said valid tracks in segment bit map corresponding to the previous version of said data A, thereby indicating that the previous version of said data is no longer valid.

27. In a log structured array (LSA) storage subsystem comprising an array control unit, a storage array of storage devices, an LSA sub-directory in said array control unit, an LSA directory in said storage array, a write buffer, and a valid in track segment bit map, a method of garbage collection, comprising the steps of:

(a) selecting a segment having a segment directory in said storage array for garbage collection according to a predetermined criterion;

(b) finding, using said segment directory, the physical address of each track in said segment having its bit set to on in said valid tracks in segment bit map;

(c) reading each of said tracks in said segment into said write buffer; and, (d) writing the content of said write buffer into a free segment of storage array.

* * * * *